Figure 2:
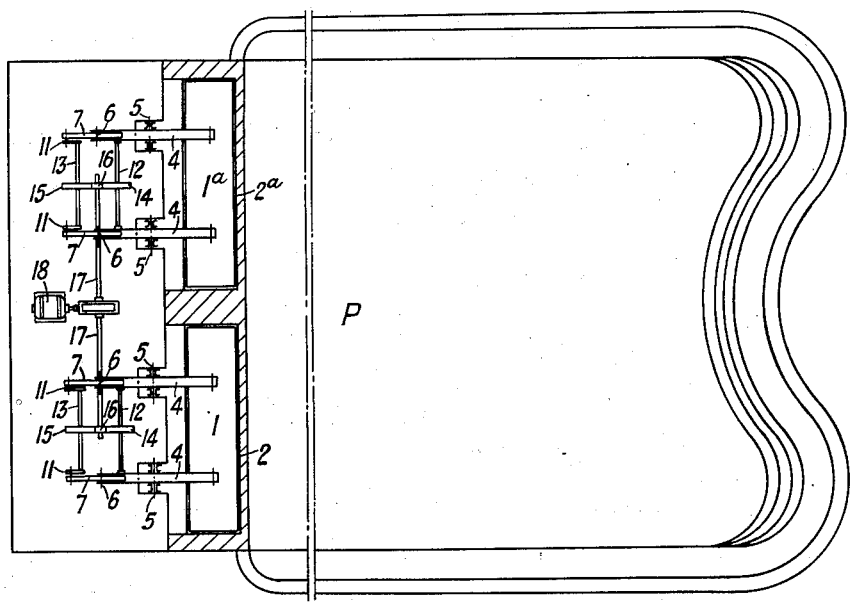

May 21, 1935.  O. A. PRICE  2,002,043
MEANS FOR PRODUCING ARTIFICIAL WAVES
Filed Jan. 30, 1935  2 Sheets-Sheet 1
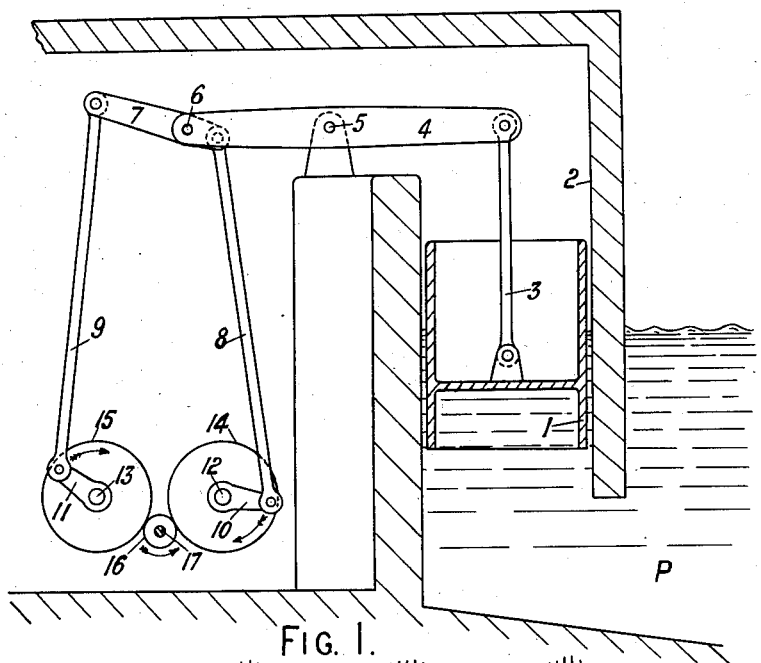
FIG. 1.
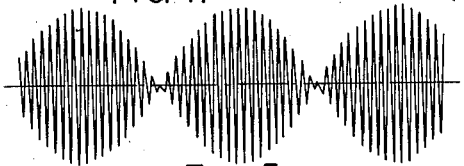
FIG. 5.
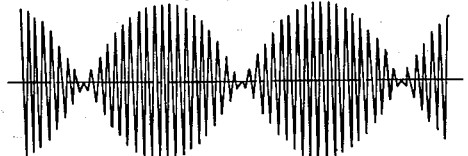
FIG. 5ª.
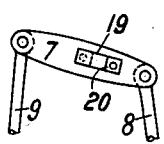
FIG. 1ª.
FIG. 6.
FIG. 6ª.
Inventor
Owen Alfred Price
By Pennie Davis Marvin & Edmonds
Attorneys May 21, 1935.　　　　O. A. PRICE　　　　2,002,043

MEANS FOR PRODUCING ARTIFICIAL WAVES

Filed Jan. 30, 1935　　　2 Sheets-Sheet 2

Patented May 21, 1935

2,002,043

UNITED STATES PATENT OFFICE 2,002,043

MEANS FOR PRODUCING ARTIFICIAL WAVES

Owen Alfred Price, Kilmarnock, Scotland

Application January 30, 1935, Serial No. 4,013
In Great Britain November 16, 1933

8 Claims. (Cl. 272—26)

In the art of producing artificial waves in swimming pools and the like it is known for the purpose of producing variation in the wavy surface to provide reciprocating displacers operating at slightly different speeds, so that there is a cyclic variation of relative stroke position with regular repetition of the full cycle of variations at intervals determined by the number of strokes constituting the cycle. The displacers are commonly reciprocated approximately in harmonic motion, since the natural wave motion is approximately harmonic, and this result is conveniently obtained by operating each displacer through a connecting rod driven from a crank rotated at a uniform speed. Hence, with two displacers driven at slightly different speeds one crank is continually gaining on the other and the respective cranks pass through the whole scale of phase differences during a complete cycle of wave variations. For instance, at one moment the two cranks will be in phase, at another moment 90° apart, and at another moment 180° apart, and so on. The highest waves are produced when the cranks are in phase; diagonal waves, higher at one side of the basin than the other, are produced when the cranks are about 90° apart, and smaller rather choppy waves are produced when the cranks are about 180° apart.

It will readily be understood that, when the displacer cranks are about 180° apart, one displacer makes downward or forward strokes concurrently with upward or return strokes of the other displacer, that there will be considerable short-circuiting of water between the two displacers at the wave-generating end of the basin and that, as a consequence of this idle pumping, a substantial proportion of the wave-forming impulse of the displacers is not conveyed to the body of water in the basin, with the result that relatively small and less definite waves are produced.

The object of the present invention is to eliminate the period of small choppy waves inseparable from the hitherto employed methods of producing variation in wave formation, and thus to combine the continually changing motion of the waves with greater consistency in wave height.

The invention is applicable to displacers of any construction, e. g., to bodily reciprocating displacers operating in open pools or in pressure shafts or the equivalent under partially immersed or totally submerged conditions, and to hinged flap horizontally oscillating displacers.

According to the invention a plurality of displacers are constrained to operate at all times in phase, whereby short circuit pumping is eliminated, the variation in wave formation being produced by varying the length of stroke (or vibration) of one displacer relatively to the other or others.

Figure 3:
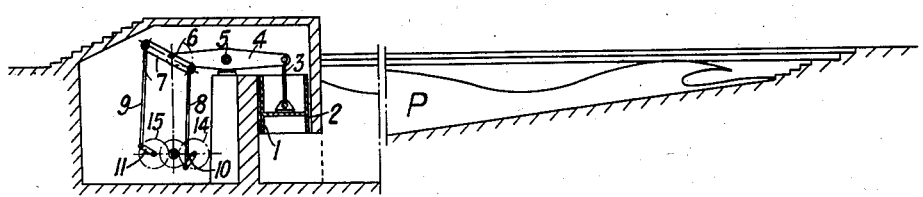
Figure 4:
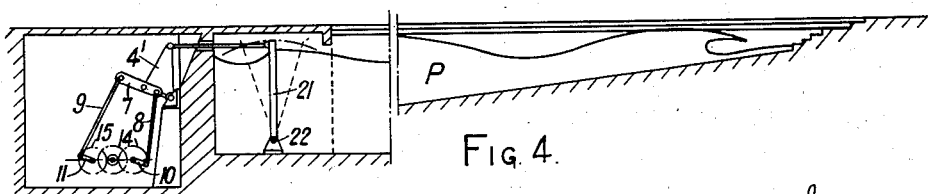

Wave-producing means constructed in accordance with the present invention is illustrated, by way of example, in the accompanying drawings in which Fig. 1 is a part elevation part vertical section showing a vertically reciprocating displacer and its actuating mechanism, Fig. 1a a fragmentary detail view showing a modification, Fig. 2 a part plan part horizontal section and Fig. 3 a longitudinal vertical section, showing the arrangement of a pair of vertically reciprocating displacers at one end of a swimming pool, Fig. 4 a view corresponding to Fig. 3 showing a modified form of displacer constituted by an oscillatory flap, Figs. 5 and 5a diagrams illustrative of a range of stroke variation obtainable, and Figs. 6 and 6a further diagrams illustrative of a modified range of stroke variation.

Referring to Figs. 1-3, 1 and 1a denote a pair of displacers adapted to be reciprocated vertically within pressure shafts 2, 2a, respectively, at one end of a swimming pool P or the like. Each displacer is pivotally connected to the lower ends of a pair of upright connecting rods 3 the upper ends of which are pivotally connected to corresponding arms of a pair of rocking beams 4 operating in parallel and pivoted between their ends at 5. Pivoted at 6 to the other arm of each beam 4 is a double-armed compensating lever 7 to the opposite ends of which are connected the upper ends of a pair of links 8, 9 the lower ends of which are connected to cranks 10, 11 on adjacent ends of two parallely disposed shafts 12, 13. A second pair of cranks 10, 11 is provided on the opposite ends of the shafts 12, 13 for the other rocking beam 4. Secured on the shaft 12 is a spur gear 14, and secured on the shaft 13 is a spur gear 15, both spur gears meshing with a common gear pinion 16 on a driving shaft 17 geared together with the corresponding shaft 17 of the driving mechanism of the other displacer, to an electric motor 18 or other prime mover.

The spur gears 14, 15 are differentially toothed, so that the cranks 10, 11 are rotated at slightly different speeds.

The compensating lever 7 shown has arms of unequal lengths, but it may have arms of equal lengths, or may be formed as shown in Fig. 1a with a slot 19 adjustably engaged by a pivot block 20, so that the position of the pivot block may be varied depending on the range of stroke variation required.

In operation, owing to the small difference in the rates of rotation of the cranks 10 and 11 the stroke-varying mechanism performs a cycle of motions during each interval between successive identical angular positions of the cranks 10 and 11. As the differential rate of rotation is small, the cranks 10, 11 will operate substantially in parallel for several revolutions during which the associated rods 8, 9 will function, in effect, as a single rod and there will be little or no rocking of the lever 7 relatively to the beam 4, so that the rocking movement of the beam 4 will be a maximum regardless of the position of the pivot 6 in lever 7. As the relative angular displacement of the cranks 10, 11 increases, the lever 7 rocks on its pivot 6 relatively to the beam 4 and the rocking movement of the beam 4 decreases. Thus, if the cranks 10, 11 are relatively displaced to the extent of 180° and the lever 7 is centrally pivoted, little or no rocking movement will be imparted to the beam 4. If, however, the lever 7 is pivoted off-centre as shown in Fig. 1, the beam 4 will be rocked to an extent depending on the ratio of inequality of the arms of the lever 7. It will readily be understood, therefore, that by suitably proportioning the mechanism any desired range of stroke variation may be imparted to the displacer.

In the event of a pool being equipped with a single displacer only cycles of waves successively varying in height and having crests parallel to the ends of the pool, would be produced.

With two displacers as shown the respective stroke-varying mechanisms may be so relatively timed that one displacer is performing its maximum stroke while the other displacer is performing its minimum stroke. The range of stroke variation with this timing is shown conventionally in Figs. 5 and 5a which represent the performance of two displacers of which the levers 7 of the stroke varying mechanisms are centrally pivoted whereby the strokes vary from maximum to zero. Figs. 6 and 6a show a range of strokes varying from maximum stroke to about half maximum and obtainable by pivoting the levers 7 off centre to the requisite extent. As is understood, by suitably altering the positions of the pivots of the levers 7 other ratios of maximum to minimum stroke may be obtained.

The effect on the water of two such displacers is to produce great variety in the wave formation so that, during each complete cycle of waves, no two waves are alike. Waves higher at one end than the other with continually changing inclination transversely of the pool, first towards one side and then towards the other side of the pool, follow one another in succession, also waves of uniform height and waves which break parallel to the ends of the pool. By suitably determining the number of teeth in the spur gearing any desired number of waves may be produced in a cycle.

In the modification shown in Fig. 4 each displacer is constituted by an oscillatory flap 21 pivoted at its lower edge at 22 and oscillated by stroke-varying mechanism as hereinbefore described with the exception that the beams 4 of the arrangements shown in Figs. 1-3 are replaced by bell-crank levers 4'. This arrangement is convenient when it is necessary that the pool shall have a flush coping at the wave-generating end.

I claim:—

1. Wave-producing means for swimming pools and the like, comprising, in combination, a plurality of displacers, means for imparting to said displacers reciprocating movements in phase, the relation of the amplitudes of reciprocating movements of said displacers being varied during their reciprocation without varying the phase relation of said movements.

2. Wave-producing means for swimming pools and the like, comprising, in combination, a plurality of displacers, rock levers, one connected to each displacer, means for imparting substantially synchronous rocking movements to said levers, whereby said displacers are constrained to reciprocate in phase, the extent of rocking movement of said levers relatively to one another being varied during operation while the synchronism of their rocking movements is maintained.

3. Wave-producing means for swimming pools and the like, comprising, in combination, a pair of displacers, a pair of rock levers, one connected to each displacer, means for imparting substantially synchronous rocking movements to said levers, whereby said displacers are constrained to reciprocate in phase, the extent of rocking movement of one lever relatively to the other being varied during operation.

4. Wave-producing means for swimming pools and the like, comprising, a pair of displacers, a pair of rock levers, one connected to each displacer, and means for imparting substantially synchronous rocking movements to said rock levers whereby said displacers are constrained to reciprocate continuously in phase, said means including pairs of cranks, the cranks of each pair rotating at different speeds whereby the extent of rocking movement of said levers relative to one another is varied during their operation while the synchronism of their rocking movements is maintained.

5. Wave-producing means for swimming pools and the like, comprising, a pair of displacers, a pair of rock-levers, one connected to each displacer, a compensating lever connected to each rock lever, said compensating levers imparting substantially synchronous rocking movements to said rock-levers to cause said displacers to reciprocate in phase, and a pair of cranks rotating at different speeds connected to each compensating lever for shifting the position of each compensating lever relative to its rock-lever whereby the extent of rocking movement of said levers relative to one another is varied during operation while the synchronism of their rocking movements is maintained.

6. Wave-producing means for swimming pools and the like, comprising, a pair of displacers, a pair of rock levers, one connected to each displacer, a pair of compensating levers having sliding and pivotal connections with said rock levers, said compensating levers imparting substantially synchronous rocking movements to said rock-levers to cause said displacers to reciprocate in phase, and a pair of cranks rotating at different speeds connected to each compensating lever for shifting the position of each compensating lever relative to its rock-lever whereby the extent of rocking movement of said levers relative to one another is varied during operation while the synchronism of their rocking movements is maintained.

7. Wave-producing means for swimming pools and the like, comprising, a pair of displacers, a pair of rock levers, one connected to each displacer, compensating levers connected to said rock levers, means for imparting substantially synchronous rocking movements to said rock levers by way of said compensating levers, whereby said displacers are constrained to reciprocate in phase, said means including pairs of cranks, pairs of differentially toothed gears, one rotating with each crank, and a common pinion meshing with each pair of gears whereby the extent of rocking movement of said rock-levers relative to one another is varied during operation while the synchronism of their rocking movements is maintained.

8. Wave-producing means for swimming pools and the like, comprising, a pair of displacers, means for imparting to said displacers reciprocating movements maintained in phase, the amplitudes of the reciprocating movements of said displacers being varied during their reciprocation, the variation in amplitude of the reciprocating movements of one of said displacers being effected out of time with the variation in amplitude of the reciprocating movements of the other displacer.

OWEN ALFRED PRICE.